July 6, 1943. S. E. HEVERS 2,323,468
TEA POT
Filed Dec. 9, 1941
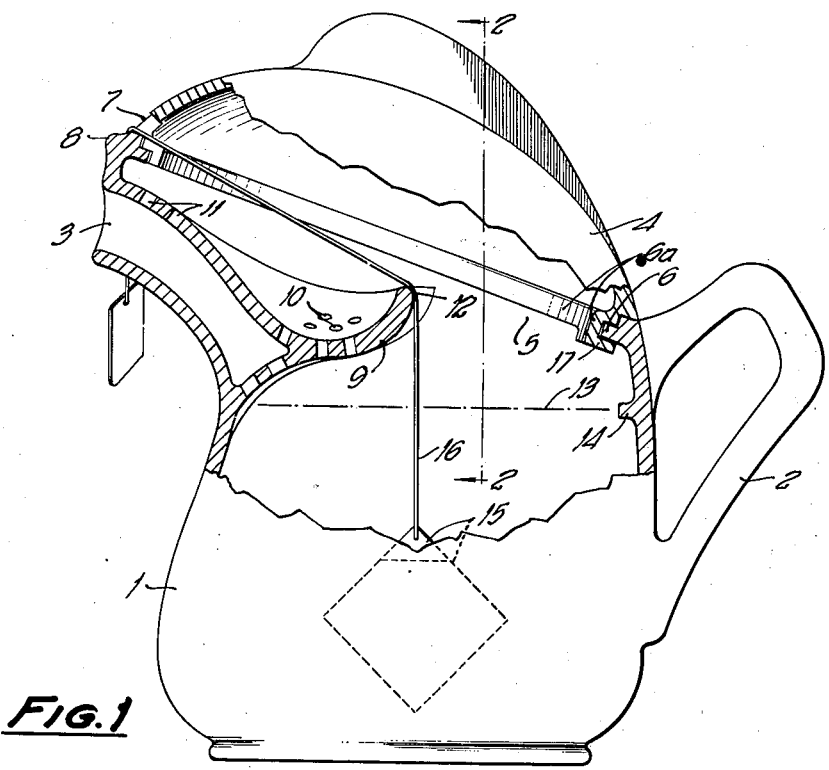
Fig.1
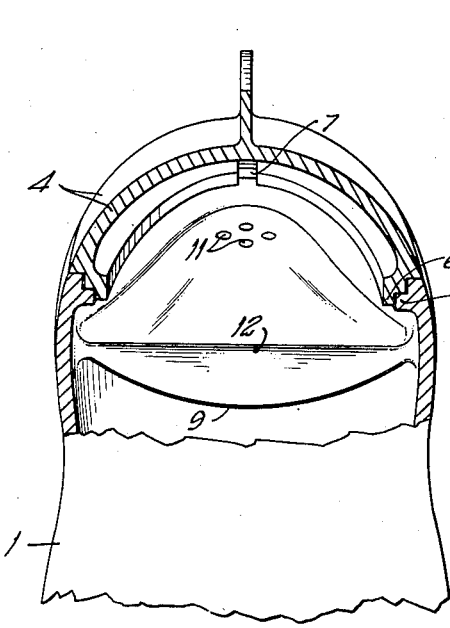
Fig.2
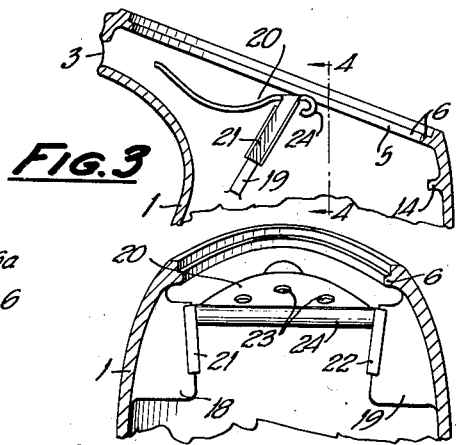
Fig.3
Fig.4
INVENTOR
Sylvester E. Hevers
by R. V. Craddock
ATTORNEY Patented July 6, 1943

2,323,468

UNITED STATES PATENT OFFICE 2,323,468

TEAPOT

Sylvester E. Hevers, Waterford, N. Y.

Application December 9, 1941, Serial No. 422,246

6 Claims. (Cl. 53—3)

My invention particularly relates to a tea pot which is of the character and size ordinarily employed for individual serving purposes, that is, one which will hold from about one to three cups of water.

Tea pots of this nature, used extensively in restaurants and similar places, are usually served to the customer with the hot water therein and a tea bag which the customer places in the water in the pot. After infusion has taken place for a time interval sufficient to provide a liquor of the desired strength, the tea bag is removed from the pot and, ordinarily, is placed adjacent the side of the tea pot on a saucer which is provided for the purpose. Naturally, liquid from the tea bag wets the sides of the tea pot and drips therefrom, as the tea is poured, upon the table or tablecloth.

It is the object of my invention to provide a tea pot which is so designed and constructed that tea may be prepared therein substantially in the manner above set forth but the tea bag may be supported within the pot and above the liquid therein thereby obviating any necessity of entirely removing the tea bag and its attendant undesirable results.

More particularly it is an object of my invention to provide a tea pot with a ledge in the interior thereof adapted to support a tea bag thereon and the pot and cover being so relatively arranged as to provide an opening therebetween through which the cord of the tea bag may be drawn, said ledge being so disposed relative to the cover and said opening that a tea bag may be drawn from the liquid in the pot and deposited upon the ledge without removing the cover of the pot. The opening between the cover and pot is preferably adjacent the pouring opening of the pot so that when the tea is poured the tea bag cannot fall from the ledge.

A further object lies in providing a ledge of the foregoing character which is either integral with the pot or which is removable.

With these and other objects in view, my invention includes the novel constructions and relative arrangement of parts described below and illustrated in the accompanying drawing, in which—

Fig. 1 is an elevation view, partially broken away and in section, of a tea pot embodying my invention;

Fig. 2 is a fragmentary view, partially in section of the pot of Fig. 1, taken in about the plane 2—2 thereof;

Fig. 3 is a fragmentary, sectional elevation view of a tea pot showing a modified construction; and Fig. 4 is a fragmentary sectional view of the pot of Fig. 3, taken in about the plane 4—4 thereof.

Referring to the drawing and first to Figs. 1 and 2, 1 indicates generally the body of a tea pot provided with a handle 2 and a pouring opening 3. A cover 4 is provided for the pot. The body of the pot about the opening 5 in the top thereof is preferably formed with an inwardly directed flange 6 upon which a shoulder on the cover may rest, and the cover may be provided with a downwardly extending flange 6a to abut the inside of flange 5 whereby to prevent appreciable lateral movement of the cover relative to the body of the pot when placed thereon.

It will be observed that in the preferred form of tea pot, the opening in the top thereof lies generally in an oblique plane, sloping downwardly from the front of the pot above the pouring opening toward the back of the pot or handle. The cover of course is designed accordingly to fit the top of the pot and is preferably of a hollow, dome-shaped construction, as shown. The purpose of forming the rim of the pot and positioning the opening between the pot and the cover in the foregoing manner will hereinafter appear.

Furthermore, the cover and the rim about the opening 5 in the pot are so relatively arranged as to provide an opening 7 therebetween through which the cord of a tea bag may be drawn. This opening may be formed in the cover, as shown, or it may be formed in the rim of the pot or formed in part in both the rim and the cover. Preferably, the opening is arranged adjacent the pouring opening 3 in the pot. A knob 8 may be formed on the pot and over the pouring opening 3 to insure that the cord on a tea bag lies to one side thereof.

Within the body of the pot 1, I provide a ledge as indicated generally at 9. In accordance with my invention, this ledge lies on the side of the pot adjacent the opening 7 between the pot and cover. The ledge 9 is preferably dish-shaped as shown and in the embodiment shown forms in part an interior spout terminating in the pouring opening 3 of the pot. Openings 10 may be provided extending downwardly through the ledge in the lowermost zone thereof through which liquid from a tea bag, deposited thereon may drip. Other openings 11 may also be provided in the ledge near its junction with the side of the pot adjacent the pouring opening so that any liquid which runs along the ledge during a pouring operation will pass to the tea being poured rather than run over the rim of the pot.

The free edge 12 of the ledge preferably extends between opposite sides of the pot and through generally a central zone thereof, affording an adequate opening through which a tea bag may be dropped into the water beneath the ledge. In a tea pot for individual use, the water level will lie substantially at the height indicated by the dot-dash line 13. A projection 14 may be used as a guide in filling the pot.

The edge 12 of the ledge may bow inwardly from the pot sides toward the pouring-opening side of the pot and the edge 12 is so spaced below the inner surface of the curved cover and so spaced in a lateral direction from the opening 7 between the cover and pot that a tea bag, indicated at 15, after immersion in the water in the pot may be drawn by the cord 16 thereof, which passes through opening 7, upwardly and over the edge 12 of the ledge and deposited on said ledge without removing the cover of the pot.

In practice, I find that a tea bag may be freely drawn upwardly over the edge 12 of the ledge in an individual type tea pot when the central zone of the edge 12 is spaced about 2¾" from the opening 7 through which the cord of the tea bag is drawn. In order to form a compact pot body and yet obtain the necessary spacing of the edge 12 and opening 7 while affording an opening sufficiently large to enable the tea bag to be readily immersed in the water in the pot, I not only space the edge 12 in a lateral direction from the opening but also dispose it somewhat below said opening. Furthermore, for free movement of the tea bag over the edge of the ledge, opening 7 should lie somewhat above the level of the edge 12 when the pot rests on its base. Hence, I arranged the rim about the opening 5 in the top of the pot in generally an oblique plane, the uppermost portion thereof lying, when the pot rests upon its base, adjacent the pouring opening 3 whereby the opening 7 between rim and cover lies at a maximum elevation above the edge 12 of the ledge.

The ledge 9 is preferably located adjacent the pouring opening so that, when pouring, a tea bag supported on said ledge cannot fall therefrom into the liquid in the pot. Also, the opening 7 between rim and cover is preferably spaced substantially equal distances from the ends of the free edge 12 of the ledge.

A flange 17 extending outwardly from the flange 6a which depends from the cover 4 may be provided for preventing the cover from falling off while pouring. This flange, of course, extends but a short distance peripherally of flange 6a.

With a pot of the foregoing character, the tea bag 15, when desired, may be freely drawn up and over the edge of the ledge 9 and deposited thereupon, without removing the cover 4, simply by pulling on the cord 16, and tea may be poured without the tea bag falling back into the liquid and without drainings from the tea bag overflowing the rim of the pot while pouring.

In Figs. 3 and 4, I have shown a modification wherein the ledge is removable. In this form of my invention, the body and cover may be formed, generally speaking, as above described but on opposite sides of the pot and interiorly thereof are provided lugs 18 and 19. The inner faces of these lugs converge toward the base of the pot and preferably extend in an oblique direction downwardly toward the front or pouring opening side of the pot.

A removable insert forming a ledge, indicated at 20, is shaped to fit within the body of the pot and may be curved as shown to provide a depression in which the tea bag may be deposited. Depending from the ledge-forming portion of the insert and on opposite sides thereof are two channels 21 and 22 adapted to engage the lugs 18 and 19, respectively. The insert, obviously, is positioned within the pot simply by sliding the channels along the lugs until further movement is prevented and when so positioned it may bear substantiallly the same relationship to the cover and opening 7 between the rim of the pot and the cover as hereinbefore described in connection with Figs. 1 and 2. The ledge portion of the inesrt may be provided with openings 23 therein for drainage purposes and the edge 24 thereof may be curved as shown. The insert may be formed of metal or any other suitable material and its form lends itself to a stamping operation.

While I have described my invention in its preferred embodiments, it is to be understood that the words which I have used are words of description rather than of limitation and that changes within the purview of the appended claims may be made without departing from the true scope and spirit of my invention in its broader aspects.

What I claim is:

1. A tea pot comprising a body provided with a pouring opening therein and a cover for said body, the interior of said body being provided with means forming a ledge having its free edge extending between opposite sides of said body and through substantially a central zone thereof and being adapted to support a tea bag when placed thereon, said body and cover being so relatively formed as to provide an opening therebetween when said cover is placed on said body through which the cord of a tea bag may be drawn and said ledge being disposed to the side of said body adjacent said opening between the body and cover; said ledge affording free access for immersing a tea bag in a liquid therebelow and within said body but the free edge thereof being spaced below the portion of said cover overlying the same when said cover is positioned on said body and below and laterally from the opening between the body and cover sufficiently to enable a tea bag freely to be drawn upwardly from the liquid over said edge and upon said ledge without removing the cover.

2. A tea pot comprising a body provided with a pouring opening therein and a cover for said body, said body and cover being so relatively formed as to provide an opening therebetween and adjacent said pouring opening when said cover is placed on said body through which the cord of a tea bag may be drawn, said body being provided interiorly thereof with means forming a ledge adapted to support a tea bag when placed thereon, said ledge being disposed adjacent said pouring opening and the free edge thereof being spaced below and laterally from said opening between the cover and body and being spaced below the portion of said cover overlying the same when said cover is positioned on said body sufficiently to enable a tea bag freely to be drawn upwardly and over said free edge and upon said ledge without removing the cover.

3. A tea pot comprising a body provided with a pouring opening therein and a cover for said body, said body and cover being so relatively formed as to provide an opening therebetween and adjacent said pouring opening when said cover is placed on said body through which the cord of a tea bag may be drawn, said body being provided interiorly thereof with a ledge integral with said body and in part defining a passage to said pouring opening, said ledge being adapted to support a tea bag when placed thereon and its free edge being spaced below and in a lateral direction from said opening between the cover and body and being spaced below the portion of said cover overlying the same when said cover is positioned on said body sufficiently to enable a tea bag freely to be drawn upwardly and over said free edge and upon said ledge without removing the cover.

4. A tea pot comprising a body provided with a pouring opening therein and a rim defining an opening in the top thereof and a cover for said body adapted to seat on said rim, the interior of said body being provided with means forming a ledge having its free edge extending between opposite sides of said body and through substantially a central zone thereof and being adapted to support a tea bag when placed thereon, said body and cover being so relatively formed as to provide an opening therebetween when said cover is placed on said body through which the cord of a tea bag may be drawn and said ledge being disposed to the side of said body adjacent said opening between the body and cover; the rim at the top of said body being substantially obliquely disposed when said body rests on its base and said opening between the body and cover being disposed at substantially the uppermost zone of said rim; said ledge affording free access for immersing a tea bag in a liquid therebelow and within said body but the free edge thereof being spaced below the portion of said cover overlying the same when said cover is positioned on said body and below and in a lateral direction from the opening between the body and cover sufficiently to enable a tea bag freely to be drawn upwardly from the liquid over said edge and upon said ledge without removing the cover.

5. A tea pot comprising a body provided with a pouring opening therein and a cover for said body, said body and cover being so relatively formed as to provide an opening therebetween and adjacent said pouring opening when said cover is placed on said body through which the cord of a tea bag may be drawn, removable means adapted to form a support for a tea bag when placed within said body and means disposed interiorly of said body and cooperable with said first mentioned means for operatively supporting it within said body and adjacent said pouring opening with a free edge thereof spaced below and laterally from said opening between the cover and body and spaced below the portion of said cover overlying the same when said cover is positioned on said body sufficiently to enable a tea bag freely to be drawn upwardly and over said free edge and upon said ledge without removing the cover.

6. A tea pot comprising a body provided with a pouring opening therein and a cover for said body, the interior of said body being provided with means forming a ledge having its free edge extending between opposite sides of said body and through substantially a central zone thereof and being adapted to support a tea bag when placed thereon, said body and cover being so relatively formed as to provide an opening therebetween when said cover is placed on said body through which the cord of a tea bag may be drawn and said ledge being disposed to the side of said body adjacent said opening between the body and cover; said ledge affording free access for immersing a tea bag in a liquid therebelow and within said body; the free edge of said ledge being of concave curvature toward the central interior of said body and said free edge being spaced below the portion of said cover overlying the same when said cover is positioned on said body and below and laterally from the opening between the body and cover sufficiently to enable a tea bag freely to be drawn upwardly from the liquid over said edge and upon said ledge without removing the cover.

SYLVESTER E. HEVERS.